Nov. 5, 1935.  P. W. FORSBERG  2,020,114
CONTROL SYSTEM
Filed Dec. 22, 1933
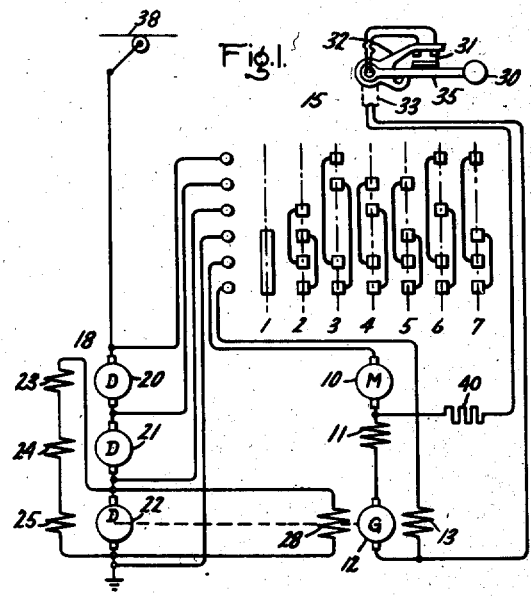
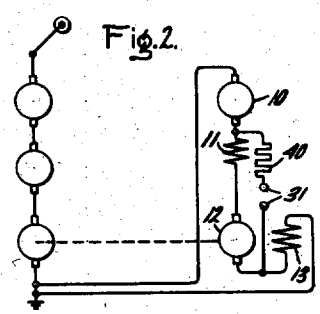
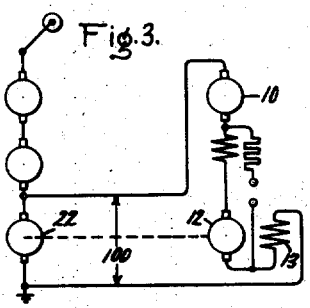
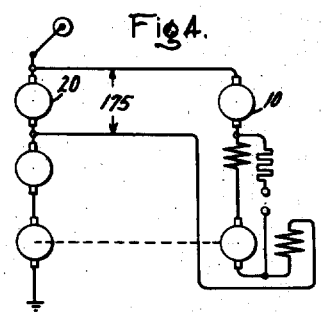
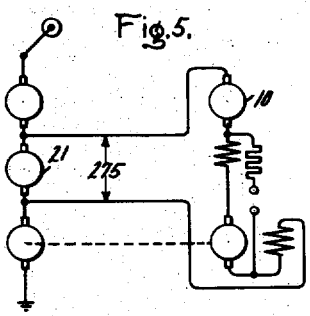
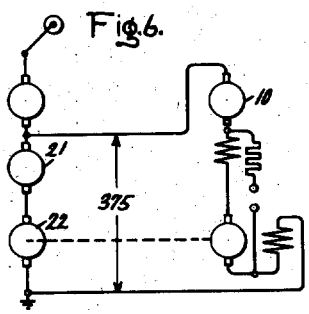
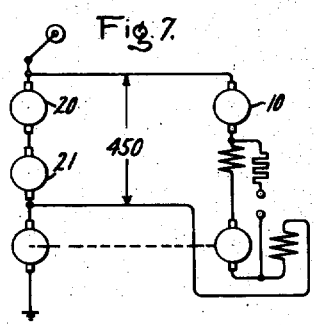
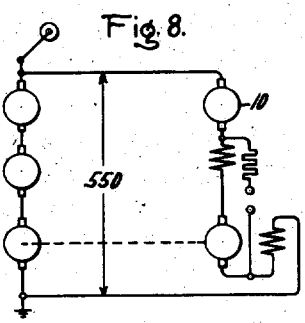
Inventor:
Peter W. Forsberg,
by *Charles V. Tullo*
His Attorney.

Patented Nov. 5, 1935

2,020,114

UNITED STATES PATENT OFFICE 2,020,114

CONTROL SYSTEM

Peter W. Forsberg, Schenectady, N. Y., assignor to General Electric Company, a corporation of New York Application December 22, 1933, Serial No. 703,566

7 Claims. (Cl. 172—179)

My invention relates to control systems for traction drives, and has for an object the provision of a simple and reliable control system wherein acceleration and deceleration of the motors can be controlled without the losses incident to the use of starting resistors.

Heretofore it has been proposed to divide the trolley voltage across different points of a dynamotor and to accelerate the driving motors by varying the voltage applied to the driving motors from the dynamotor. In one system of this general type it has been necessary for satisfactory operation to control both the main circuits and also the excitation on the dynamotor. In other systems of this type, it is only necessary to control the excitation of the dynamotor but for satisfactory operation compound motors have been used.

In accordance with the present invention in one form thereof, I provide series traction motors arranged to be accelerated by varying the motor voltage in accordance with the division of voltage across the dynamotor. In order to obtain regeneration at any point, or accelerating notch of the controller handle, it is only necessary to move the controller handle towards its original position. More specifically, I arrange the operating handle of the controller to cooperate with a lost motion connection so that whenever the operating handle is moved backwardly the lost motion connection closes a contactor to complete a regenerative braking circuit which includes a resistance and a generator excited by the motor current.

For a more complete understanding of my invention, reference should now be had to the drawing wherein I have shown diagrammatically in Fig. 1 a controller system embodying my invention, while Figs. 2 to 8, inclusive, illustrate in simplified form the connections completed for the several positions of the controller shown in Fig. 1.

Referring now to Fig. 1, I have shown my invention in one form as applied to the control of a traction motor 10 provided with a series field winding 11. The motor 10 and its series field winding 11 are connected in series with the armature of an exciter 12 and a series field winding 13 provided on the exciter 12. The acceleration of the traction motor 10 is controlled by means of a controller 15 having seven accelerating positions and notches and a dynamotor 18 provided with armatures 20, 21 and 22 and field windings 23, 24 and 25. The exciter 12 is also provided with a separately excited field winding 28 which is connected in the armature 22 of the dynamotor 18.

It will be observed that the controller is provided with an operating handle 30 arranged to be operated in a clockwise direction for operating the controller from its first to its seventh position. When the operating handle 30 is operated in a counterclockwise direction it is arranged to close the contacts 31 to establish a braking circuit on the motor. This is accomplished by providing a lost motion connection. As shown, this connection comprises a Y-shaped member 32 secured to the operating shaft 33 of the controller. The armature 35 for the operating handle 30 moves between the arms of the controller so that a certain amount of lost motion is thereby obtained.

In the operation of my invention it will be assumed that the trolley 38 is energized and that the operating handle 30 is rotated in a clockwise direction to move the controller to position 1 or the first accelerating notch. The connections completed are illustrated in Fig. 2. The motor 10 and the exciter or auxiliary generator 12 are connected in closed circuit relation with each other.

It will be understood that the division of the trolley ground voltage across the armatures 20, 21 and 22 of the dynamotor may be predetermined by properly designing the dynamotor. For the purpose of simplifying the description it will be assumed that the trolley ground voltage is divided so that 175 volts appears across the armature 20 of the dynamotor and that 275 and 100 volts appear, respectively, across the dynamotor armatures 21 and 22. It will also be assumed that the auxiliary generator or exciter 12 can generate a maximum of 50 volts.

As soon, therefore, as the controller is moved into the first notch the generator 12 will have a voltage of approximately 30 to 35 volts due to the excitation provided by its field winding 28. Motoring current, therefore, flows through the field winding 13 and the armature of the motor 10 and the exciting voltage is gradually increased to approximately 50 volts. It will, therefore, be seen that on the first notch smooth acceleration is obtained due to the gradual increase of motor current.

If it is desired to decelerate on the first notch by braking, it is only necessary to operate the handle 30 in a counter-clockwise direction to close the contacts 31. A by-pass circuit is thereby completed through a resistor 40 for the motor field winding 11. Consequently, the motor 10 operating as a generator causes the deceleration of the car. The rate of deceleration is gradually decreased because the motor current flowing through the exciter field winding 13 reduces the excitation of the auxiliary generator or exciter 12.

Continuing with the operation of my invention, it will be understood that after the connections of Fig. 2 are completed a relatively large flow of current through the motor 10 and the auxiliary generator 12 causes the auxiliary generator to build up its voltage to its upper limit of 50 volts. However, as the speed of the motor 10 increases, its counter-electromotive force reduces the motor current causing a corresponding decrease in the voltage of the generator 12. If now the controller is operated by the handle 30 to its second accelerating notch the voltage applied to the motor 10 and the auxiliary generator 12 is increased to 100 volts corresponding to the voltage across the dynamotor armature 22 plus an additional voltage that is being generated by armature G. The torque of the motor 10 incident to the application of increased voltage increases a predetermined amount and is thereafter gradually but quickly increased due to the rise in voltage on the auxiliary generator 12. This rise in voltage caused by the rise in the motoring current flowing through the auxiliary generator field winding 13 is delayed somewhat due to the inductance of the field winding 13. In each of the accelerating notches or positions the auxiliary generator 12 functions in the same manner to "soften" the steps during motoring.

The acceleration of the motor 10 is completed by operating the controller 15 through the accelerating positions 3 to 7, inclusive. In the third accelerating position, as shown in Fig. 4, the motor is connected across the dynamotor armature 20 thereby increasing the voltage applied to the motor from 100 volts to 175 volts.

In the fourth accelerating position, as shown in Fig. 5, the motor is connected across the dynamotor armature 21 to increase the voltage applied to the motor from 175 to 275 volts.

In the fifth accelerating position the motor is connected across the dynamotor armatures 21 and 22 to increase the voltage applied to the motor 10 from 275 to 375 volts.

In the sixth accelerating position the motor 10 is connected across the dynamotor armatures 20 and 21 to increase the voltage applied to the motor from 375 to 450 volts.

In the last accelerating position the motor is connected directly to the trolley voltage of 550 volts. In each of these accelerating steps it will be understood that the exciter or auxiliary generator 12 adds its voltage to the motor circuit. For example, in the last accelerating notch 7 the full speed of the motor is reached when the exciter voltage of 50 volts is generated so that the voltage across the motor 10 is 600 volts.

It will be remembered that for the first accelerating notch the manner of obtaining regenerative braking was described. Similarly, in each of the accelerating notches regenerative braking may be obtained at any time by rotating the handle 30 of the controller in a counterclockwise direction to close the contacts 31. This feature is an important part of the present invention. By use of the dynamotor 18 the losses incident to the use of starting resistors are avoided, the motor is accelerated, and by varying the connections across the dynamotor armatures the auxiliary generator 12 produces a much smoother acceleration and deceleration between successive positions of the controller than if it were not provided. A series traction motor is used so that the desirable characteristics of the series motor are obtained and regenerative braking can be obtained at any time on the series traction motor by reason of the lost motion connection on the controller handle 30.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:—

1. In combination, a motor provided with a series field winding, a controller operable through a plurality of positions for controlling the energization of said motor, a generator permanently connected in series circuit relation with said motor, operating means for said controller, a lost motion connection between said operating means and said controller, and means including said lost motion connection for completing a shunt circuit from said generator to said motor field winding to regeneratively brake said motor.

2. In combination, a traction motor provided with a series field winding, a generator having a series field winding and a separately excited field winding, connections for connecting the armature of said motor in series circuit relation with said generator, a controller operable through a plurality of positions for controlling the energization of said motor, an operating handle for said controller, a lost motion connection between said handle and said controller, and means including said lost motion connection and said generator for regeneratively braking said motor with said controller occupying any one of its plurality of positions.

3. In combination, a traction motor provided with a series field winding, a generator having series and separately excited field windings, connections for connecting the armature of said motor in series circuit relation with said generator, a controller operable through a plurality of positions for controlling the energization of said motor, an operating handle for said controller, a lost motion connection between said operating handle and said controller, and means including said lost motion connection for completing a connection across the armature of said generator and said series field winding of said motor thereby to produce regenerative braking of said motor.

4. A motor control system, comprising a source of supply, a motor provided with series field windings, a dynamotor provided with a plurality of armatures for dividing the voltage of said source of supply across the armatures of said dynamotor, a generator normally connected in series circuit relation with said motor, a separately excited field winding for said generator, a controller for connecting said motor to said dynamotor so as to vary progressively the voltage applied to said motor and thereby to control its acceleration, and a series accumulative field winding for said generator for controlling the voltage of said generator in accordance with the magnitude of said motor current.

5. A motor control system comprising a source of supply, a motor provided with a series field winding, a dynamotor provided with a plurality of armatures for dividing the voltage of said source of supply across its plurality of armatures, a controller for connecting said motor to said dynamotor to increase progressively the speed of said motor, an operating handle for said controller, a lost motion connection between said operating handle and said controller, a generator normally connected in series circuit relation with said motor, series and separately excited field windings for said generator, and means including said lost motion connection for connecting said generator in closed circuit relation with said series field winding of said motor for producing at any time regenerative braking of said motor.

6. A motor control system comprising a source of supply, a motor provided with a series field winding, a dynamotor provided with a plurality of armatures for dividing the voltage of said source of supply across its armatures, a generator driven by said dynamotor and normally connected in series circuit relation with said motor, a series field winding and a separately excited field winding for said generator, a controller operable through a plurality of positions for connecting said motor across the armatures of said dynamotor to vary progressively the voltage applied to said motor, and means operable at any position of said controller for connecting said generator to said motor field winding for regeneratively braking said motor.

7. In combination, a source of supply, a series traction motor, a generator connected in series circuit relation with said motor and said source of supply, a series field winding and a separately excited field winding for said generator, a controller operable through a plurality of positions for progressively increasing the voltage applied to said motor and to said generator from said source of supply, connections completed by the operation of said controller to its first position for connecting said generator in closed circuit relation with said motor, said generator operating on said first position as the sole current supply to said motor to produce a gradual increase of motor current and acceleration, and means for connecting said generator in circuit with said series motor so as to regeneratively brake said motor.

PETER W. FORSBERG.